Feb. 27, 1962    E. C. WENTZ ET AL    3,023,386
WINDING FOR ELECTRICAL APPARATUS
Filed May 27, 1958    2 Sheets-Sheet 1
Fig.1.
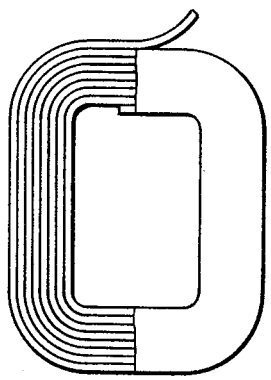
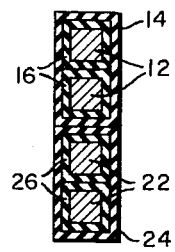
Fig.4.
Fig.3A.
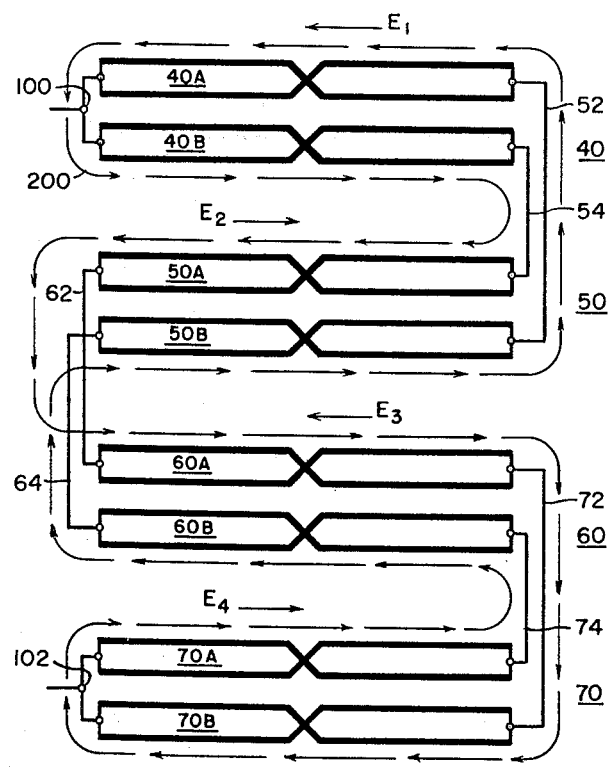
Fig.3B.
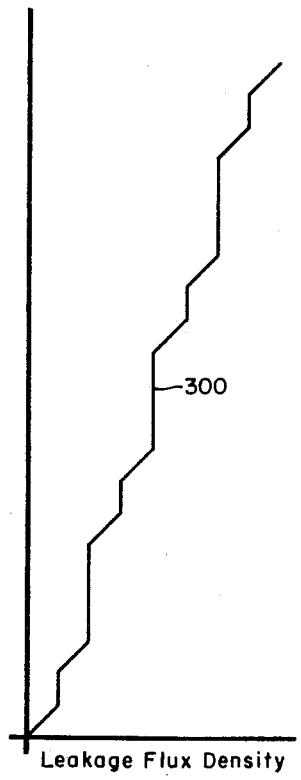
Leakage Flux Density
WITNESSES
Edwin E. Bassler
Clement L. McHale
INVENTORS
Edward C. Wentz, Harold R. Moore
& William D. Albright
BY F. E. Browder
ATTORNEY United States Patent Office
3,023,386
Patented Feb. 27, 1962

3,023,386
WINDING FOR ELECTRICAL APPARATUS
Edward C. Wentz and Harold R. Moore, Hickory Township, Mercer County, and William D. Albright, Sharon, Pa., assignors to Westinghouse Electric Corporation, East Pittsburgh, Pa., a corporation of Pennsylvania
Filed May 27, 1958, Ser. No. 738,112
12 Claims. (Cl. 336—187)

This invention relates to windings for electrical inductive apparatus, such as a transformer, and more particularly to an arrangement of conductors in the windings of such apparatus.

It is well known that the eddy-current losses in a copper conductor of inductive apparatus, such as a transformer winding, vary with the square of the dimension of the conductor at right angles to the direction of the leakage flux, which in the case of the interleaved type of winding, is approximately at right angles to the axis of the winding or in the plane of the winding coils. A conventional method of reducing eddy-current losses in the windings of the transformer is to reduce the dimension of the conductor at right angles to the direction of the leakage flux by subdividing the required conductor area into two or more conducting elements or strands which are insulated from each other without using a larger quantity of conductor material. Although the latter method reduces the eddy-current losses in the windings of a transformer, there is an offsetting increase in losses due to circulating currents between the parallel connected strands or subdivided conducting elements. One method employed to reduce the losses resulting from circulating current in a winding whose coils are formed from parallel connected strands or subdivided conductors is to transpose the relative position of the strands with respect to the direction of the leakage flux.

In one type of transposition, such as disclosed in U.S. Patent No. 1,872,247, which issued on an application of H. L. Cole et al., the two parallel connected strands from which the coils of a winding are formed are transposed with respect to their relative positions in the path of the magnetic leakage flux at a point approximately midway between their points of common connection. The latter method of transposition reduces losses due to circulating currents in the winding when two strands or subdivided conducting elements are employed to form the coils of the winding. When, however, three or more strands or subdivided conducting elements are employed to form the coils of a winding, the latter method of transposition is inadequate to reduce the losses resulting from circulating currents to a low value, since the voltage induced between pairs of strands by the leakage flux will still cause substantial losses due to circulating currents, and the transposition of the strands will in general be imperfect. It is, therefore, desirable to provide a winding for electrical apparatus including a plurality of coils formed from three or more strands or subdivided conducting elements in which losses due to circulating currents are reduced to a low value.

It is an object of this invention to provide a new and improved winding for electrical apparatus.

Another object of this invention is to provide a new and improved winding for electrical apparatus including a plurality of coils formed from subdivided conductors or strands.

A further object of this invention is to provide a winding for electrical apparatus having a greater efficiency by reducing the eddy-current losses in said winding and by reducing the losses due to circulating current between the parallel connected strands included in the coils of said winding.

Other objects of this invention will in part be obvious and will in part appear hereinafter.

For a fuller understanding of the nature and objects of the invention, reference should be had to the following detailed description taken in connection with the accompanying drawing in which FIG. 1 is a plan view of a coil of the pancake type in which this invention may be employed.

FIGURE 3A is a diagrammatical representation of a portion of the windings of the transformer shown in FIG. 1 illustrating how the circulating currents in the windings are reduced to a low value.

FIG. 3B is a graph illustrating the variation of the leakage flux density in the different coils of the windings shown in FIG. 3A; and FIG. 4 is a cross sectional view illustrating one arrangement of the strands or subdivided conductors and insulation from which the windings of the transformer shown in FIG. 2 are formed.

Figure 2:
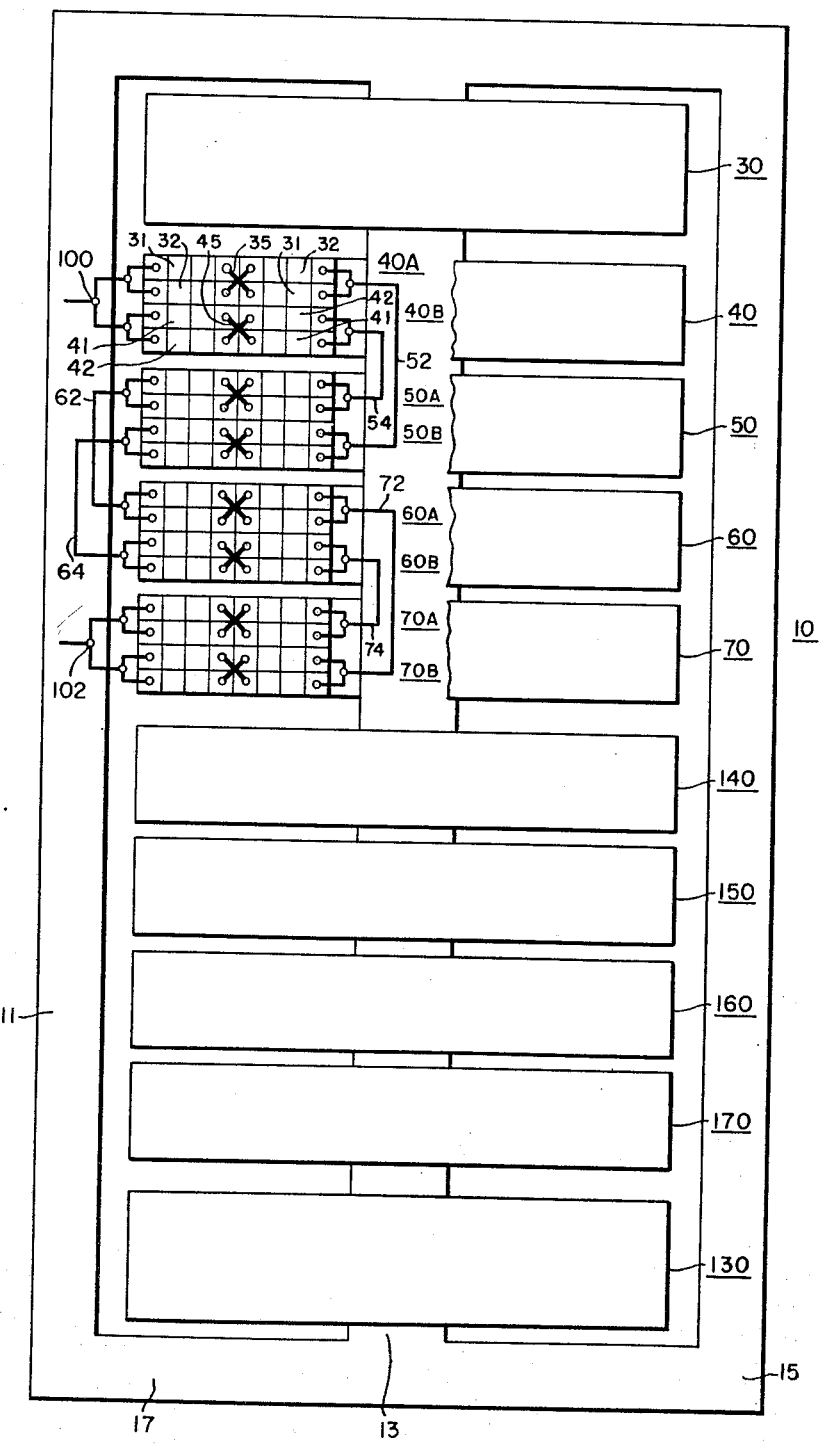
FIG. 2 is a vertical sectional view of the core and windings of a transformer showing the connections of the strands and the transpositions thereof within the coils of said windings.

Referring to FIG. 4 of the drawings, a pancake coil of the type shown in FIG. 1 may be formed from a main conductor comprising a first pair of strands or subdivided conducting elements 12 and a second pair of strands or subdivided conducting elements 22. The strands 12 are each separately taped or wrapped with the insulation 16 and the strands 12 are then taped or wrapped together with the insulation 14. The strands 22 are similarly each taped or wrapped with the insulation 26 and the strands 22 are then wrapped or taped together with the insulation 24. The current carried by the coil shown in FIG. 1 is, therefore divided among four strands or subdivided conducting elements which are divided transversely of the axis of the coil, the four strands being insulated from each other. The coil shown in FIG. 1 is therefore formed from a main conductor having at least three subdivided conducting elements or strands per layer as shown in FIG. 4 and may include as many layers per turn of the coil as required in a particular application.

Referring to FIG. 2, there is illustrated a transformer 10 including a core member 17 having two windows formed by the outer leg members 11 and 15 and the middle or the winding leg member 13. The windings of the transformer 10 include a plurality of coils connected in groups. The high voltage or primary winding of the transformer 10 includes a first group of coils 40, 50, 60 and 70 and a second group of coils 140, 150, 160 and 170. The low voltage or secondary winding of the transformer 10 includes a first plurality of coils 30 and a second plurality of coils 130 which are separated from each other by the high voltage winding of the transformer 10. The first and second pluralities of low voltage coils 30 and 130 may each include one or more groups of coils as described hereinafter in connection with the high voltage winding. The coils included in the high and low voltage windings of the transformer 10 are of the pancake or flat-disc type shown in FIG. 1, each of said coils being formed from at least three or more subdivided conducting elements or strands divided transversely with respect to the axis of the respective coils.

In particular, the first group of high voltage coils 40, 50, 60 and 70 are connected between the terminals 100 and 102. The high voltage coil 40 comprises first and second coil sections 40A and 40B. Similarly the high voltage coils 50, 60 and 70 each includes first and second coil sections 50A and 50B, 60A and 60B and 70A and 70B, respectively. The high voltage coil section 40A is formed from two parallel connected strands or subdivided conducting elements 31 and 32, the strands 31 and 32 being insulated from each other and subdivided transversely with respect to the axis of the high voltage coil 40. The strands 31 and 32 are transposed as indicated at 35 at a point approximately midway between the points of common connection of the strands 31 and 32. The strands 31 and 32 are transposed longitudinally with respect to the axis of the high voltage coil 40 or are transposed with respect to their relative positions in the path of the leakage magnetic flux whose direction is approximately at right angles to the axis of the coil 40 or substantially parallel to the plane of the coil 40.

It is to be noted that the strand 31 is above the strand 32 for approximately one half the length of the coil section 40A and in the reverse position for the balance of the coil section 40A. In similar manner, the coil section 40B of the high voltage coil 40 comprises two parallel connected strands 41 and 42 which are insulated from each other and from the strands 31 and 32 and which are divided transversely with respect to the axis of the coil 40. It is to be understood that the coil sections 40A and 40B, each includes at least one pair of parallel connected strands or subdivided conducting elements which are insulated from each other and divided transversely of the axis of the high voltage coil 40 and that additional pairs of strands may be provided in each coil section in a particular application to provide the required current rating. The strands 41 and 42 are similarly transposed as indicated at 45 at a point approximately midway between their points of common connection, the strands 41 and 42 being transposed longitudinally with respect to the axis of the high voltage coil 40. The coil sections 50A and 50B, 60A and 60B, and 70A and 70B of the high voltage coils 50, 60 and 70, respectively, similarly each include at least one pair of strands or subdivided conductors insulated from each other and transposed in similar fashion to the strands of the coil sections 40A and 40B of the high voltage coil 40.

In general, the coil sections of each of the high voltage coils 40, 50, 60 and 70 are connected in two parallel paths between the terminals 100 and 102, the two parallel paths forming a closed loop which includes all of the coil sections of the high voltage coils 40, 50, 60 and 70 which comprise the first group of high voltage coils. In particular, the first parallel path between the terminal 100 and the terminal 102 includes the series circuit which can be traced from the terminal 100, through the coil section 40A and the conductor 52 to the right end of the coil section 50B, through the coil section 50B and the conductor 64 to the left end of the coil section 60B, through the coil section 60B and the conductor 74 to the right end of the coil section 70A, and through the coil section 70A to the terminal 102. The second parallel path between the terminal 100 and the terminal 102 includes the series circuit which can be traced from the terminal 100 through the coil section 40B and the conductor 54 to the right end of the coil section 50A, through the coil section 50A and the conductor 62 to the left end of the coil section 60A, through the coil section 60A and the conductor 72 to the right end of the coil section 70B, and through the coil section 70B to the terminal 102. One end of each of the coil sections of the terminal coils 40 and 70 is connected to one of the respective common terminals 100 or 102. One end of each of the sections of the intermediate coils 50 and 60 is connected to one end of the upper coil section of an adjacent coil and the other end of each section is connected to one end of a lower coil section in an adjacent coil. It is to be noted that the second group of high voltage coils 140, 150, 160 and 170 would be disposed and connected similarly to the high voltage coils 40, 50, 60 and 70. It is also to be understood that the method of transposition disclosed could also be applied to the portions of the low voltage windings 30 and 130 which may each include one or more groups of coils.

It is to be noted that the transposition of each pair of strands which make up the coil sections of the high voltage coils 40, 50, 60 and 70 substantially eliminates circulating currents caused by the voltage induced between the strands of each pair of subdivided conductors in each of the coil sections. The transposition of the strands in each pair, however, does not eliminate circulating currents resulting from the voltage induced between the coil sections which comprise each of the high voltage coils 40 through 70 by the magnetic leakage flux. The voltage induced between the sections of each coil by the magnetic leakage flux is due to the physical separation of the effective centers of the coil sections which make up each of the high voltage coils 40 through 70. It is to be noted that the direction of the induced voltage in each of the high voltage coils 40 through 70 is opposite to the voltage induced in the adjacent coils because of the manner in which the ends of the respective sections of each coil are connected to the ends of the coil sections of the adjacent coils, that is, the inside ends of the sections of each coil are connected to the inside ends of the sections of one adjacent coil, and the outside ends of the sections of the same coil are connected to the outside ends of the sections of the other adjacent coil. It is also to be noted that the magnitude of the voltage induced in each of the high voltage coils 40 through 70 by the leakage flux also varies from coil to coil because of the variation in the magnetic leakage flux density as will be explained hereinafter.

Referring now to FIGURES 3A and 3B, the manner in which the method of transposition and interconnection of the coils reduces losses due to circulating currents in the first group of high voltage coils 40 through 70 will now be described. Referring to FIGURE 3A, there is illustrated diagrammatically the internal transposition of the coil sections of the high voltage coils 40 through 70 and the external interconnections of the sections of said high voltage coils. $E_1$ represents the voltage induced beween the coil sections 40A and 40B of the high voltage coil 40. Similarly, $E_2$, $E_3$, and $E_4$ represent the voltages induced between the coil sections 50A and 50B of the high voltage coil 50, between the coil sections 60A and 60B of the high voltage coil 60, and between the coil sections 70A and 70B of the high voltage coil 70, respectively, by the leakage magnetic flux.

Referring to FIGURE 3B, there is illustrated by the curve 300 the manner in which the leakage magnetic flux density varies from the coil section 70B of the high voltage coil 70 to the coil section 40A of the high voltage coil 40. Because of the variation in the leakage flux density as shown in FIG. 3B, the induced voltage $E_1$ is larger in magnitude than the induced voltage $E_2$ which, in turn, is larger than the induced voltage $E_3$, which, in turn, is larger than the induced voltage $E_4$. In an actual application, it has been found that the sum of the induced volages $E_1$ and $E_4$ is approximately equal to the sum of the induced voltages $E_2$ and $E_3$ because of the variation in the leakage flux density.

Referring again to FIGURE 3A, the coil sections of the high voltage coils 40 through 70 are interconnected to form a closed loop as indicated by the dotted arrowed line 200 in FIGURE 3A. As previously mentioned, circulating current between the strands of each pair, which are included in each of the coil sections of the high voltage coils 40 through 70, is substantially eliminated by the transposition of each pair of strands. Therefore, the circulating current which flows in the closed loop formed by the coil sections of the high voltage coils 40 through 70 depends on the total net induced voltage in the closed loop as indicated by the arrowed line 200.

The total induced voltage in the closed loop comprising the sections of the high voltage coils 40 through 70 will now be traced considering that the induced voltages having the same direction as the arrowed line 200 are positive and that induced voltages having the opposite direction are negative. Starting at the terminal 100 and proceeding in the direction of the arrowed line 200, the total induced voltage in the closed loop will equal to: $(-E_2-E_3+E_4+E_1)$. Since $E_1+E_4$ is approximately equal to $E_2+E_3$, the total induced voltage in the closed loop just traced will be approximately equal to zero or to a very low value. If the total induced voltage is not equal to zero, the circulating current in the closed loop just described will be equal to the net induced voltage divided by the effective resistance of all the coil sections of the high voltage coils 40 through 70 which make up the closed loop, considered as a series circuit. Therefore, even if there is a small net induced voltage in the closed loop, the circulating current will be held to a low value by the resistance of the closed loop 200.

In summary, the winding for electrical apparatus as disclosed substantially eliminates or reduces circulating current and the associated losses by transposing each pair of strands which make up the sections of the coils included in each winding and interconnecting the sections of the coils in each group so that the induced voltages between the sections of half the coils oppose the induced voltages between the sections of the other half of the coils in said group. The interconnections also take into account the variation in the magnitude of the induced voltage in the different coils due to the variation in the leakage flux density across the group of coils. It is to be noted that the starting and finishing terminals 100 and 102, respectively of the first group of high voltage coils 40 through 70 may be connected to carry current from or to additional groups of high voltage coils such as the second group of high voltage coils, which includes the coils 140, 150, 160 and 170. The method of transposition and interconnections described takes advantage of the fact that the induced voltages between the sections of adjacent coils in each group are of opposite directions because of the manner in which the ends of the sections of adjacent coils are connected as previously described. Since the closed loop, in which circulating current might otherwise flow, includes the coil sections of a plurality of coils, circulating current is also held to a minimum as previously mentioned because of the effective resistance of the various coil sections included in each closed loop.

It is to be noted that each of the coil sections which make up a complete coil of the pancake type in a winding as disclosed can be wound and insulated separately. The two sections of the coil may then be assembled to make up a complete coil as disclosed.

It is to be understood that each coil section of a coil as disclosed may include more than one pair of strands or subdivided conducting elements as required in a particular application. A coil of the type disclosed includes at least two coil sections but may include any plurality of sections. In other words, a coil of the type disclosed may include any number of conductors per layer, preferably a plurality of at least three strands or subdivided conducting elements per layer. In addition, a group of coils in the winding of the type disclosed may include any plurality of coils. Although illustrated with an even number of coils in a group, the invention may be employed with an odd number of coils in each group, the interconnections of the sections of the coils being suitably modified in accordance with the teachings of the invention. Although the invention has been described as applied to rectangular coils of the pancake type or flat disc type, it may be also applied to coils having a generally circular shape or to any form of winding in which the leakage flux is parallel to the place of the coils.

A winding for an electrical inductive apparatus, such as a transformer incorporating the teachings of this invention, has several advantages. For example, for a particular quantity of conductor material, such as copper, in the windings of the apparatus, the efficiency of the apparatus is increased by reducing the eddy-current losses and reducing the circulating current resulting from the use of a conductor including a plurality of strands. On the other hand, in order to provide apparatus having a predetermined efficiency or value of losses due to eddy-currents and circulating currents, the amount of conductor material may be reduced since a winding incorporating the teachings of this invention has lower losses due to eddy-currents and circulating currents compared to windings of the same type employed in the past. In addition, the connections of the ends of the coil sections of the coils in a winding, as disclosed, are conveniently made to the nearest ends of the coil sections in the adjacent coils rather than extending across the face of the coils which would lengthen the connecting conductors and be less convenient during assembly of a winding.

In general, the winding disclosed can be used for inductive apparatus having higher ratings in order to provide the necessary current carrying capacity or in apparatus of lower ratings to reduce the eddy-current losses by using a larger number of narrow subdivided conductors rather than a smaller number of wider conductors. In other words, the winding disclosed reduces eddy-current losses by increasing the number of strands or subdivided conductors from which the coils of the winding are formed while using the same amount of conducting material. Therefore, the effective width of the strands or the subdivided conductors at right angles to the direction of the leakage flux is reduced to thereby reduce the eddy-current losses in the winding while still holding the circulating current losses to a very low value.

Since numerous changes may be made in the above described apparatus and different embodiments may be made without departing from the spirit thereof, it is intended that all the matter contained in the foregoing description or shown in the accompanying drawing shall be interpreted as illustrative and not in a limiting sense.

We claim as our invention:

1. In an electrical apparatus, a winding comprising a plurality of electrically connected flat-disc type coils assembled in groups, said coils each including at least two sections, said sections each being formed of parallel-connected strands insulated from each other and divided transversely of the axis of the coils, said strands of each section being transposed longitudinally of the axis of the coils at a point approximately midway between the points of their common connections, the sections of the coils in each group being interconnected to form a closed loop with the voltage induced between the sections of each coil opposing the voltages induced between the sections in the adjacent coils by the leakage magnetic flux caused by current flowing in said winding to reduce the total voltage induced in the coils of said loop by said leakage flux to a negligible value.

2. An electrical winding comprising a plurality of flat-disc type coils each including at least two sections, each section formed from a subdivided conductor having at least one pair of parallel-connected strands insulated from each other, the strands of each pair being arranged along a path substantially at right angles to the path of the leakage magnetic flux caused by current flowing in said winding, said strands of each section being electrically connected in parallel and being transposed with respect to their relative positions in said magnetic path at a point approximately midway between their points of common connection, said sections of said coils being interconnected in groups to form a closed loop in which the effective voltages induced between the sections of each coil are opposing in alternate coils to thereby reduce the total voltage induced in said loop by said leakage flux to a negligible value.

3. In a transformer, a winding comprising a plurality of coils electrically connected and assembled in groups, each group including a plurality of coils, each coil comprising first and second sections, each section being formed from at least one pair of parallel-connected strands insulated from each other, the strands of each pair being arranged along a path substantially perpendicular to the path of the leakage magnetic flux caused by current flowing in said winding, said strands being connected in parallel and transposed with respect to their relative positions in said magnetic path at a point approximately midway between their points of common connection, one end of each of the sections of the first and last coils of each group being connected to respective common points, the ends of the sections of the intermediate coils being connected to the ends of the sections of the adjacent coils to form a closed loop including all sections of each group, the voltages induced by said leakage flux between the sections of half of the coils of said group opposing the voltages induced in the other half of said coils of said group to reduce the total induced voltage in said loop and the circulating current resulting therefrom to negligible values.

4. In a transformer, a primary winding comprising a plurality of electrically connected coils connected in groups and a secondary winding separating said groups and also comprising a plurality of groups of electrically connected coils, said latter coils each including at least two sections, each section being formed from a subdivided conductor having one or more pairs of parallel-connected strands insulated from each other, the strands of each pair being arranged along a path substantially at right angles to the path of the leakage magnetic flux caused by current flowing in said windings, said strands of each section being connected in parallel and being transposed with respect to their relative positions in said magnetic path at a point approximately midway between their points of common connection, the sections of the coils in each group being interconnected to form a closed loop with the voltage induced by said leakage flux between the sections of each coil opposing the voltages induced between the sections of each adjacent coil and to reduce the total voltage induced in said loop by said leakage flux and the circulating current caused by said total voltage to negligible values.

5. In an electrical apparatus, a winding comprising an even numbered plurality of coils electrically connected and assembled into groups, each coil comprising an upper section and a lower section, each of said sections being formed from at least one pair of parallel-connected strands insulated from each other and divided transversely with respect to the axis of said coils, said strands of each section being transposed longitudinally of the axis of said coils at a point midway between the points of their common connections, one end of each of the sections of the terminal coils in each group being connected to respective common points, one end of each of the upper sections of the intermediate coils being connected to the lower section of one adjacent coil and the other end being connected to the upper section of the other adjacent coil and one end of each of the lower sections of the intermediate coils being connected to the upper section of one adjacent coil and the other end being connected to the lower section of the other adjacent coil to form a closed loop in each group, the voltages induced between the sections of half the coils in each group by the leakage magnetic flux produced by current flowing in said winding being opposing with respect to the voltages induced in the other half of the coils of said group to reduce the total induced voltage in said loop and the circulating current resulting therefrom to a negligible value.

6. In a transformer, a primary winding and a secondary winding comprising a plurality of interleaved coils connected in groups, each group comprising a plurality of coils, each coil comprising at least two sections, each section including at least one pair of strands insulated from each other, each pair of strands being disposed at substantially right angles to the path of the leakage magnetic flux produced by current flowing in said windings, the strands of each pair being connected in parallel and transposed with respect to their relative positions in said magnetic path at a point approximately midway between their points of common connection, the sections of the coils in each group being interconnected to form a closed loop with alternate connections between the sections of adjacent coils being transposed so that the voltages induced between the sections of half the coils in each group by said leakage flux oppose the voltages between the sections induced of the other half of the coils in each group to reduce the total induced voltage in said group and the circulating current resulting therefrom to negligible values.

7. In an electrical apparatus, a winding comprising a plurality of electrically connected pancake type coils assembled in groups, said coils each including at least two sections disposed substantially parallel to one another, said sections each being formed of parallel-connected strands insulated from each other and divided transversely of the axis of the coils, said strands of each section being transposed longitudinally of the axis of the coils at a point approximately midway between the points of their common connections, the sections of the coils in each group being interconnected to form a closed loop with the voltage induced between the sections of each coil opposing the voltages induced between the sections in the adjacent coils by the leakage magnetic flux caused by current flowing in said winding to reduce the total voltage induced in the coils of said loop by said leakage flux to a negligible value.

8. An electrical winding comprising a plurality of pancake type coils each including at least two sections, each section formed from a subdivided conductor having at least one pair of parallel-connected strands insulated from each other, the strands of each pair being arranged along a path substantially at right angles to the path of the leakage magnetic flux caused by current flowing in said winding, said strands of each section being electrically connected in parallel and divided transversely of the axis of said coils and being transposed with respect to their relative positions in said magnetic path at a point approximately midway between their points of common connection, said sections of said coils being interconnected in groups to form a closed loop in which the effective voltages induced between the sections of each coil are opposing in alternate coils to thereby reduce the total voltage induced in said loop by said leakage flux to a negligible value.

9. In a transformer, a winding comprising a plurality of pancake type coils electrically connected and assembled in groups, each group including a plurality of coils, each coil comprising first and second sections, each section being formed from at least one pair of parallel-connected strands insulated from each other, the strands of each pair being arranged along a path substantially perpendicular to the path of the leakage magnetic flux caused by current flowing in said winding, said strands being connected in parallel and transposed with respect to their relative positions in said magnetic path at a point approximately midway between their points of common connection, one end of each of the sections of the first and last coils of each group being connected to respective common points, the ends of the sections of the intermediate coils being connected to the ends of the sections of the adjacent coils to form a closed loop including all sections of each group, the inside ends of the sections of each of said coils in each group being connected to the inside ends of the sections of one of the adjacent coils and the outside ends of the sections of each of said coils being connected to the outside ends of the sections of the other adjacent coil, the voltages induced by said leakage flux between the sections of half of the coils of said group opposing the voltages induced in the other half of said coils of said group to reduce the total induced voltage in said loop and the circulating current resulting therefrom to negligible values.

10. In a transformer, a primary winding comprising a plurality of electrically connected pancake type coils connected in groups and a secondary winding separating said groups and also comprising a plurality of groups of electrically connected coils, said latter coils each including at least two sections, each section being formed from a subdivided conductor having one or more pairs of parallel-connected strands insulated from each other, the strands of each pair being arranged along a path substantially at right angles to the path of the leakage magnetic flux caused by current flowing in said windings, said strands of each section being connected in parallel and being transposed with respect to their relative positions in said magnetic path at a point approximately midway between their points of common connection, the inside ends of the sections of each of said coils in each group being connected to the inside ends of the sections of one of the adjacent coils and the outside ends of the sections of each of said coils being connected to the outside ends of the sections of the other adjacent coil, the sections of the coils in each group being interconnected to form a closed loop with the voltage induced by said leakage flux between the sections of each coil opposing the voltages induced between the sections of each adjacent coil and to reduce the total voltage induced in said loop by said leakage flux and the circulating current caused by said total voltage to negligible values.

11. In an electrical apparatus, a winding comprising an even numbered plurality of coils electrically connected and assembled into groups, each coil comprising an upper section and a lower section and being of the type in which the direction of the leakage magnetic flux is substantially parallel to the plane of said coil when current flows in said winding, each of said sections being formed from at least one pair of parallel-connected strands insulated from each other and divided transversely with respect to the axis of said coils, said strands of each section being transposed longitudinally of the axis of said coils at a point midway between the points of their common connections, one end of each of the sections of the terminal coils in each group being connected to respective common points, one end of each of the upper sections of the intermediate coils being connected to the lower section of one adjacent coil and the other end being connected to the upper section of the other adjacent coil and one end of each of the lower sections of the intermediate coils being connected to the upper section of one adjacent coil and the other end being connected to the lower section of the other adjacent coil to form a closed loop in each group, the voltages induced between the sections of half the coils in each group by the leakage magnetic flux produced by current flowing in said winding being opposed with respect to the voltages induced in the other half of the coils of said group to reduce the total induced voltage in said loop and the circulating current resulting therefrom to negligible values.

12. In a transformer, a primary winding and a secondary winding comprising a plurality of interleaved flat-disc type coils connected in groups, each group comprising a plurality of coils, each coil comprising at least two sections, each section including at least one pair of strands insulated from each other, each pair of strands being disposed at substantially right angles to the path of the leakage magnetic flux produced by current flowing in said windings, the strands of each pair being connected in parallel and transposed with respect to their relative positions in said magnetic path at a point approximately midway between their points of common connection, the inside ends of the sections of each of said coils in each group being connected to the inside ends of the sections of one of the adjacent coils and the outside ends of the sections of each of said coils being connected to the outside ends of the sections of the other adjacent coil, the sections of the coils in each group being interconnected to form a closed lop with alternate connections between the sections of adjacent coils being transposed so that the voltages induced between the sections of half the coils in each group by said leakage flux oppose the voltages between the sections induced of the other half of the coils in each group to reduce the total induced voltage in said group and the circulating current resulting therefrom to negligible values.

References Cited in the file of this patent

UNITED STATES PATENTS

| | | |
|---|---|---|
| 1,629,462 | Palueff | May 17, 1927 |
| 1,834,114 | Wiggins | Dec. 1, 1931 |
| 1,872,247 | Cole et al. | Aug. 16, 1932 |
| 2,441,804 | Farry | May 18, 1948 |

FOREIGN PATENTS

| | | |
|---|---|---|
| 247,532 | Switzerland | Dec. 1, 1947 |